Figure 1:
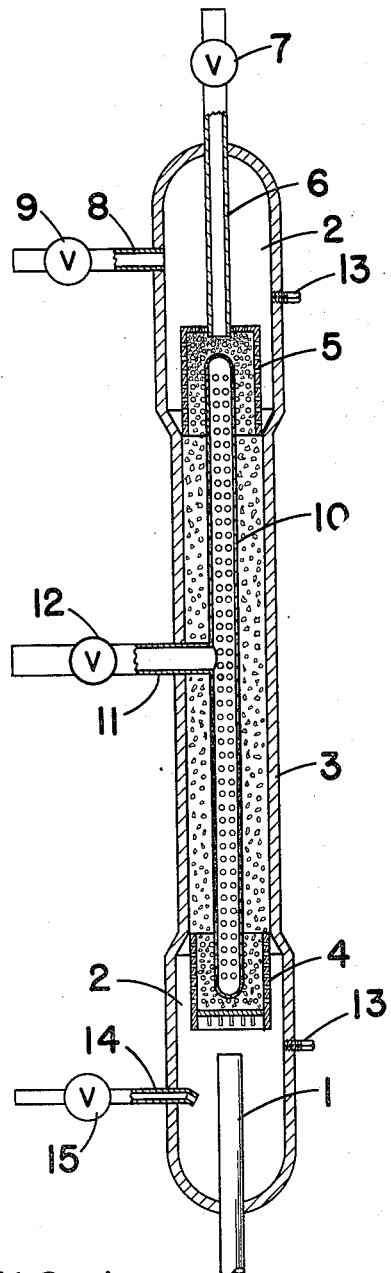

Jan. 12, 1943.    J. E. ECKEL ET AL    2,308,160
SAND FILTER FOR GAS AND OIL WELLS
Filed March 16, 1940    2 Sheets-Sheet 2

John E. Eckel
George M. McCarty    INVENTOR.
BY W. E. Currie
ATTORNEY.

Patented Jan. 12, 1943

2,308,160

UNITED STATES PATENT OFFICE 2,308,160

SAND FILTER FOR GAS AND OIL WELLS

John E. Eckel and George M. McCarty, Houston, Tex., assignors to Standard Oil Development Company, a corporation of Delaware Application March 16, 1940, Serial No. 324,308

1 Claim. (Cl. 183—48)

The present invention is directed to a device to be applied to pipe lines attached to high pressure gas wells for the purpose of removing from the gas sand particles which are carried up from the gas producing formation.

In the production of gas from high pressure gas wells the pipe line connected to the gas well contains pressure regulators and flow controls which serve to regulate the pressure on the gas to a value suitable for gas distributing systems and low pressure gas processing equipment. These flow controls and pressure regulators embody orifices and valves which, although they are usually made of case-hardened steel, are quickly eroded and rendered unfit for service by the abrading effect of sand particles carried from the producing formation by the high pressure gas. When these control elements are rendered inoperative by erosion, the heavy load placed on the subsequent low pressure equipment causes serious damage resulting from blowouts. As a result the control equipment must be carefully supervised and frequently replaced. In many cases the life of a pressure control is only about 20 days, and in some cases, where a high velocity flow is maintained in the gas line, pressure controls have been rendered inoperative in a shorter period than one hour.

According to the present invention the aforesaid difficulties are substantially eliminated by placing in the flow line from the gas well ahead of the control elements a filter for removing the sand from the gas. In its broadest aspect this filter is merely a bed of granular material, such as gravel, of suitable size to remove the sand from the gas. In general, the grain size of the filtering material will vary from the size of buckshot to pea size. It is naturally desirable to use the largest possible size of filtering material so as to minimize the pressure drop through the filtering medium. A suitable standard for the maximum grain size of filtering material that may be used may be established by measuring the size of the sand particles which are carried by the gas and ascertaining the average particle size of the largest ten percent of this sand. A filtering material may then be selected having an average grain size about twelve times that of the average particle size of the largest ten percent of the sand particles.

An object of the present invention is the provision of a device of the character described which may be easily installed and easily cleaned after it has become choked or clogged with sand.

An additional object of the present invention is the provision of a device of the character described in the form of a readily replaceable cartridge.

A further object of the present invention is the provision in a system of the character described of means for abruptly changing the direction of flow of the gas, said means being composed of material not readily abraded by sand particles.

Figure 2:
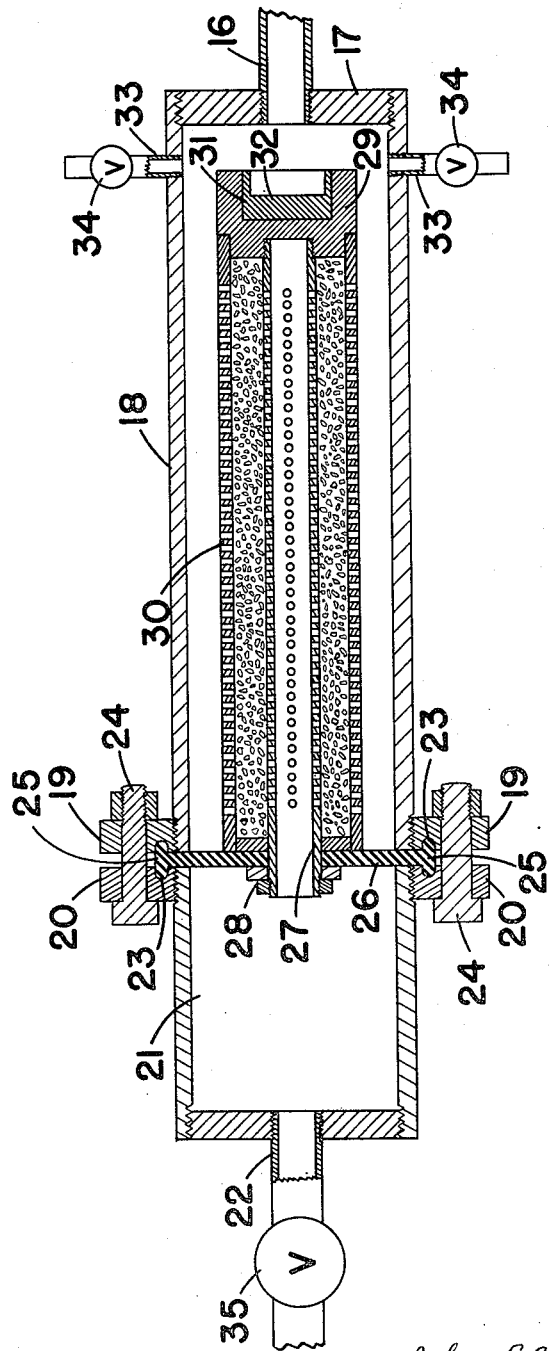

Further objects and advantages of the present invention will appear from the following detailed description of the accompanying drawings in which Fig. 1 is a vertical section of one embodiment of a device according to the present invention; and Fig. 2 is a vertical section of another and the preferred embodiment of the present invention.

Referring to Fig. 1 in detail, numeral 1 designates a pipe connected with a gas producing formation and adapted to be arranged in an upright position. Welded to pipe 1 in concentric relation therewith is a chamber 2 having an intermediate section 3 of reduced diameter. To the lower end of intermediate section 3 is welded a cylindrical perforated cage 4 which depends into the lower section of chamber 2. To the upper end of intermediate section 3 is welded a second perforated cylindrical cage 5 which extends into the upper end of chamber 2 and is provided at its upper end, in open communication therewith, with a pipe 6 which protrudes beyond the end of chamber 2 and is provided with a suitable gate valve 7. The upper end of chamber 2 is provided with a gas drawoff line 8 in which is a valve 9.

Arranged in intermediate section 3 and preferably extending substantially to the ends of cages 4 and 5 is a perforated pipe 10 having closed ends and provided intermediate its ends with a branch pipe 11 which passes through the wall of intermediate section 3 and is provided with a gate valve 12.

Chamber 2 on either side of intermediate section 3 is provided with a plug 13 to accommodate a pressure gauge. In the lower end of chamber 2 at a point below the open end of pipe 1 is an open-ended pipe 14 passing through the wall of chamber 2 and provided, outside said chamber, with a gate valve 15.

In use, intermediate section 3 and cages 4 and 5 are filled with granular material, such as gravel, of a size suitable for filtering out sand from the gas, said size being selected as heretofore indicated. The perforations in pipe 10 are usually somewhat larger than the grain size of the filtering material. The filtering material is introduced into the system through pipe 6. With valves 7, 12 and 15 in closed position and valve 9 open, the gas is fed through the system. When the pressure drop across the intermediate section becomes sufficiently great to indicate that the filtering medium is clogged with sand, valve 9 is closed and valve 15 is opened. This tends to build up pressure in the lower section of chamber 2 and causes gas to pass out through pipe 14 at a high velocity, carrying out with it any sand collected at the bottom of chamber 2. Valve 15 may then be closed and valve 12 opened, whereby sand is blown out of the system through pipe 11 by virtue of perforated pipe 10. A large amount of the filtering medium may also be discharged from the system at the same time. When the system is sufficiently blown, valve 12 is closed, valve 7 is opened, and the intermediate section and the cages are again filled with filtering material after which valve 7 is closed and valve 9 is opened to put the system again in operation.

In Fig. 2 is shown the preferred embodiment of the present invention. This embodiment of the filtering device is arranged in a horizontal position, as distinguished from the vertical position of the embodiment shown in Fig. 1. Numeral 16 in this figure designates the pipe connected with the gas producing formation. Threaded or welded to the end of pipe 16 is a heavy flange 17 carrying an elongated chamber 18 concentric with pipe 16. To the other end of chamber 18 is threaded or welded a flange 19. A similar flange 20 is threaded or welded to one end of a second chamber 21 arranged in line with chamber 18 and having fixed to its other end a pipe 22 for conveying the gas to the control devices, such as pressure controls and flow regulators. Each of the adjacent faces of flanges 19 and 20 is provided with an annular groove 23, which grooves are adapted to coincide. The flanges are provided with bolts 24 for drawing them together.

Seated in the grooves 23 is a ring 25 of softer material than the flanges 19 and 20. This ring carries a transverse web 26 which has a central opening through which passes a perforated tube 27, one end of which protrudes a short distance into chamber 21 and is provided with a collar 28 and the other end of which protrudes into chamber 18 and is substantially coextensive therewith. Threaded onto the latter end of tube 27 is a cap 29 which is provided with a seat to receive one end of a perforated tube 30 of larger diameter than tube 27. The other end of tube 30 is pressed against web 26 by cap 29. The annular space between tubes 27 and 30 is filled with filtering material of the character hereinbefore described.

The free face of cap 29 is provided with a recess 31 which is substantially filled with a plug of soft material 32, such as lead, zinc or a suitable alloy. The exposed face of this soft material is adjacent the inlet end of pipe 16 and preferably given a configuration such as to abruptly change the direction of flow of gas introduced into pipe 16. The sand in the gas will not abrade this soft material, but will be embedded in it until a sand surface is formed after which no abrasion will take place. The sharp reversal of direction of the flow of the gas causes a large amount of the sand to drop out of it. This expedient of itself serves to substantially increase the life of control devices arranged in the line behind it, but for optimum performance the filtering arrangement is used in conjunction with it.

The wall of chamber 18 is provided with suitable outlets 33, each of which carries a valve 34. These outlets may be arranged as desired along chamber 18, and there may be as many of them as desired.

In the use of the device of Fig. 2, parts 25—32 are assembled as a unit with filtering material arranged between tubes 27 and 30. This unit is then introduced into chambers 18—21, as shown, and flanges 19 and 20 are firmly clamped on ring 25. With all valves 34 closed, the gas flow is started through the system. From time to time valve 35 in outlet line 22 is closed and valves 34 are opened to permit sand collected in chamber 18 to be blown out by the gas introduced through line 16. When the pressure in the system indicates that the annular space between tubes 27 and 13 is clogged with sand, the assembly of parts 25—32 may be removed as a unit and repacked with fresh filtering material.

It is to be understood that the above described embodiments are merely illustrative of the present invention and are not intended to define its limits. Various changes in the embodiments shown will occur to those skilled in the art, and such changes are contemplated within the scope of the appended claim.

The nature and objects and the present invention having been thus defined and illustrated, what is new and useful and is desired to be secured by Letters Patent is:

In a flow line for gas carrying abrasive particles, a chamber arranged in said line, composed of two separable sections, a partition between said sections, a gas inlet in one of said sections, a gas outlet in the other of said sections, a perforated tube passing through said partition and extending toward said gas inlet, a cap carried by said tube, a perforated shell carried by said cap in such a way as to form an annular space between said shell and said tube, filtering material in said annular space, a recess in the free end of said cap arranged in juxtaposition to said gas inlet, and a lining of abrasion resistant material in said recess.

JOHN E. ECKEL.
GEORGE M. McCARTY.